US010708171B2

(12) United States Patent
Klotsche et al.

(10) Patent No.: US 10,708,171 B2
(45) Date of Patent: Jul. 7, 2020

(54) APPARATUS, METHOD AND COMPUTER PROGRAM FOR ROUTING DATA PACKETS

(71) Applicant: ALCATEL LUCENT, Paris (FR)

(72) Inventors: Ralf Klotsche, Neuenburg (DE); Bernd Haberland, Fellbach (DE)

(73) Assignee: Alcatel Lucent, Nozay (FR)

( * ) Notice: Subject to any disclaimer, the term of this patent is extended or adjusted under 35 U.S.C. 154(b) by 656 days.

(21) Appl. No.: 14/358,131

(22) PCT Filed: Oct. 9, 2012

(86) PCT No.: PCT/EP2012/069908
§ 371 (c)(1),
(2) Date: May 14, 2014

(87) PCT Pub. No.: WO2013/072137
PCT Pub. Date: May 23, 2013

(65) Prior Publication Data
US 2014/0328204 A1 Nov. 6, 2014

(30) Foreign Application Priority Data
Nov. 14, 2011 (EP) .................................... 11306475

(51) Int. Cl.
*H04L 12/761* (2013.01)
*H04L 12/26* (2006.01)
(Continued)

(52) U.S. Cl.
CPC ............ *H04L 45/16* (2013.01); *H04L 43/028* (2013.01); *H04L 45/54* (2013.01); *H04W 40/00* (2013.01)

(58) Field of Classification Search
CPC ....... H04L 45/16; H04L 45/54; H04L 43/028; H04W 40/00
See application file for complete search history.

(56) References Cited

U.S. PATENT DOCUMENTS

2002/0129086 A1 9/2002 Garcia-Luna-Aceves et al.
2004/0196854 A1 10/2004 Thubert et al.
(Continued)

FOREIGN PATENT DOCUMENTS

CN 101061686 10/2007
CN 101663867 3/2010
(Continued)

OTHER PUBLICATIONS

Geza Szabo et al., "Accurate Traffic Classification," World of Wireless, Mobile and Multimedia Networks, IEEE, 8 pages, XP031149164, Jun. 1, 2007.
(Continued)

*Primary Examiner* — Walter J Divito
*Assistant Examiner* — Anthony Luo
(74) *Attorney, Agent, or Firm* — Fay Sharpe LLP (57) ABSTRACT

Embodiments can provide an apparatus, a method and/or a computer program for routing data packets in a radio access network. The apparatus 10 comprises means for receiving 12 a data packet 804 from a source network node, the data packet comprises a data packet header and a data packet payload. The apparatus 10 further comprises means for inspecting 14 the data packet. The means for inspecting 14 is operative to perform a first packet inspection on the data packet header to determine information on a source or a destination of the data packet from the data packet header, and the means for inspecting 14 is operative to perform a second packet inspection on the data packet payload based on the information on the source or the destination of the data packet to determine information on an identification of the destination of the data packet. The apparatus 10 further comprises means for determining 16 information on a subsequent network node based on the information on the identification of the destination of the data packet.

12 Claims, 8 Drawing Sheets

(51) Int. Cl.
*H04L 12/741* (2013.01)
*H04W 40/00* (2009.01)

(56) References Cited

U.S. PATENT DOCUMENTS

| | | |
|---|---|---|
| 2006/0168270 A1 | 7/2006 | Townsley et al. |
| 2007/0274216 A1* | 11/2007 | Hashigami |
| 2008/0250478 A1* | 10/2008 | Miller ................ H04L 9/32 |
| | | 726/5 |
| 2008/0267217 A1 | 10/2008 | Colville et al. |
| 2008/0291923 A1 | 11/2008 | Back et al. |
| 2009/0034557 A1* | 2/2009 | Fluhrer ............. H04L 41/0893 |
| | | 370/474 |
| 2011/0019673 A1* | 1/2011 | Fernandez Gutierrez ................ |
| | | H04L 12/185 |
| | | 370/390 |
| 2011/0134920 A1 | 6/2011 | Dyke |
| 2011/0205959 A1 | 8/2011 | Aalto et al. |
| 2011/0274108 A1* | 11/2011 | Fan ................... H04L 12/4633 |
| | | 370/390 |
| 2012/0051346 A1* | 3/2012 | Herbert ............ H04L 29/12028 |
| | | 370/338 |

FOREIGN PATENT DOCUMENTS

| | | |
|---|---|---|
| CN | 101828362 | 9/2010 |
| EP | 1 791 063 A1 | 5/2007 |
| EP | 2 337 274 A1 | 6/2011 |
| JP | 2006-521720 | 9/2006 |
| JP | 2007-318561 | 12/2007 |
| WO | WO 2010/023646 A2 | 3/2010 |

OTHER PUBLICATIONS

International Search Report for PCT/EP2012/069908 dated Dec. 18, 2012.

* cited by examiner

APPARATUS, METHOD AND COMPUTER PROGRAM FOR ROUTING DATA PACKETS

Embodiments of the present invention relate to wireless communications, more particularly but not exclusively to routing of data packets in a radio access network.

BACKGROUND

Demands for higher data rates for mobile services are steadily increasing. At the same time modern mobile communication systems as $3^{rd}$ Generation systems (3G) and $4^{th}$ Generation systems (4G) provide enhanced technologies, which enable higher spectral efficiencies and allow for higher data rates and cell capacities. As the demand for high-rate services grows faster than the cell capacities, operators are urged to increase the number of cells in their networks, i.e. the density of base stations increases. Base station transceivers are major contributors to the overall power consumption of a mobile communication network and therewith also major contributors to the OPerational EXpenditures (OPEX) operators are facing. One power saving strategy is to move processing capacity away from the base station transceivers and towards centralized processing units providing processing capabilities for several base station transceivers. The processing equipment of a base station transceiver consumes a significant part of a base station transceiver's total power, although the processing capabilities of a base station transceiver are only fully exploited in high load conditions, which do not occur permanently, but rather during peak hours only.

Currently, Radio Access Networks (RAN) use base stations or base station transceivers, as e.g. eNodeBs for the most recent technology Long Term Evolution (LTE) or LTE-A (LTE-Advanced), handling all radio, baseband and control functions. These base stations comprise voluminous antennas at elevated positions with electronic systems requiring considerable spatial installation volume. In addition, supplementary systems for power supply, air conditioning, etc. are to be installed in close proximity. In densely populated areas such installations are to be repeated over a grid of ~1 km or less mesh width.

Mobile communication requires a highly specialized architecture of the RAN to interconnect the base stations efficiently with the telecommunication core network. Dedicated devices at strategic locations within the RAN perform functions like mobility anchoring, load balancing, paging (to find mobile devices not yet associated to a base station), and the like. Base stations offer the last hop within a RAN towards the mobile user (or the first hop in the flip or opposite direction) and relay the data forwarded from fixed network technology to radio technology. Due to the restrictions of the air interface of the underlying radio technologies, base stations have to be spread out in the area to ensure coverage and service continuity.

Recent developments on high speed optical and other fixed interfaces like the Common Public Radio Interface (CPRI) and the Open Radio equipment Interface (ORI) allow a separation of the radio part of a base station from the processing of the baseband. This leads to a decomposition of a base station transceiver into Remote Radio Head (RRH) and BaseBand Unit (BBU). Although this additional interface adds complexity to the RAN it offers a degree of freedom for placing the BBU.

SUMMARY

Embodiments are based on the finding that having the freedom to detach the BBU from the RRH gives the opportunity to concentrate several BBUs in one location to a kind of cluster or cloud. Moreover, using a cloud approach, the hardware of a BBU can be virtualized and pooled, thus allowing an assignment of resources on demand and therefore enable a limitation of over-provisioning, compared to a scenario where the association between BBU and RRH is fixed. Traditional RAN architectures consist of a hierarchy of physical components, which can be directly addressed by their IP-addresses. It is a further finding that cloud based solutions, which do not follow a paradigm of 1:1 mapping of virtual components to physical entities, can make use of additional means to spread the various information flows to the cloud elements assigned for the execution of a fraction of the functionality of the physical components standards were designed for. Moreover, such functionality may not have an impact on the standardized interfaces outside a cloud.

According to a further finding an implementation of such a RAN may need highly specialized routers that allow seamless data traffic between the RAN's edge devices, as e.g. Mobility Management Entity (MME) and Serving Gate-Way (S-GW) and the associated RRHs, because in extreme cases, e.g. at peak load in a given area, a base station transceiver can be scattered over several instances, i.e. the baseband processing of the peak loaded base station transceiver can be distributed to multiple (virtual) BBUs. Embodiments are based on the further finding that each of such an instance requires a separate address and that there is no direct mapping between such an instance and the respective edge-devices (MME/S-GW). It is a further finding that introducing this kind of routing engines allows for moving instances of BBU components, e.g. for load balancing, energy optimization, maintenance, handover, etc. independently from the RAN technology.

For example, the network's physical component to be typically, but not exclusively, virtualized is the base station transceiver, as a NodeB in case of the Universal Mobile Telecommunication System (UMTS) and an eNodeB in the LTE case. Towards the core network the 'next hop' physical element in the LTE case are the gateways MME for the control plane and the S-GW for the data plane. The gateways offer the S1 interface, as S1-Application Part (S1-AP) and S1-User plane part (S1-U) for the control- and data-plane. In the UMTS case there is the Radio Network Controller (RNC) with the IuB-interface for control as well as for data.

Embodiments provide an apparatus for routing data packets in a radio access network. The apparatus can be used by or implemented in a router within the radio access network and can subsequently also be referred to as router apparatus. The RAN can be part of a mobile communication system or network. The mobile communication system may, for example, correspond to one of the mobile communication systems standardized by the 3rd Generation Partnership Project (3GPP), as Universal Terrestrial Radio Access Network (UTRAN) or Evolved UTRAN (E-UTRAN), e.g. UMTS, a Global System for Mobile Communication (GSM) or Enhanced Data Rates for GSM Evolution (EDGE) network, a GSM/EDGE Radio Access Network (GERAN), Long-term Evolution (LTE) or LTE-Advanced (LTE-A), generally any system based on Code Division Multiple Access (CDMA), Orthogonal Frequency Division Multiple Access (OFDMA), Frequency Division Multiple Access (FDMA), Time Division Multiple Access (TDMA), etc.

The router apparatus comprises means for receiving a data packet from a source network node, the data packet comprising a data packet header and a data packet payload. The means for receiving can be implemented as an interface to the source network node. The means for receiving can correspond to a receiver, which can be implemented as an electrical or optical receiver device. In some embodiments the means for receiving may correspond to an input register or memory to which the source network node and the apparatus have access. In such an embodiment the source network node may be able to write the data packet to said register or memory by which the data packet is received at the router apparatus. The data packet can be any structure of data. For example, the data packet can correspond to a number of bits, which can be predefined. The data packet can correspond to a predefined protocol, as, for example, the Internet Protocol (IP). The predefined protocol may determine, which ones of the bits of a data packet belong to the data packet header and which ones of the bits of the data packet belong to the data packet payload.

Furthermore, the router apparatus comprises means for inspecting the data packet. The means for inspecting can be implemented as a data processing device, e.g. as a processor, a controller, etc. The means for inspecting is operative to perform a first packet inspection on the data packet header to determine information on a source or a destination of the data packet from the data packet header. The means for inspecting is further operative perform a second packet inspection on the data packet payload based on the information on the source or the destination of the data packet to determine information on an identification of the destination of the data packet. In other words, at least two packet inspections are carried out, where one refers to the data packet header and the other one refers to the data packet payload. The outcome of the second inspection of the data packet payload yields the information on the identification of a later destination of the data packet. The router apparatus further comprises means for determining information on a subsequent network node based on the information on the identification of the destination of the data packet. In other words, the subsequent network node is selected based on the information on the later destination of the data packet from the data packet payload. In further embodiments the router apparatus can comprise means for forwarding the data packet to the subsequent network node.

The radio access network can comprise a plurality of BBUs for processing baseband data for subsequent radio transmission. A baseband processing unit can be assigned to process data of a service of the destination of the data packet. The subsequent network node can thus correspond to the BBU, which is assigned to a service the data packet payload relates to. Embodiments can therewith enable efficient routing in a RAN, especially when using a cloud of BBUs, where the individual BBUs can be flexibly assigned with processing tasks.

Embodiments can provide a routing engine emulating one or (typically) more base station transceivers towards the core network, which are composed of a set of virtual instances from the type Serving Channel Element Module (SCEM) and Control CEM (CCEM), which can be established at a BBU. A data packet, which, for example, may arrive at the router apparatus as an IP-packet with an IP-address of a certain user of the RAN as a destination address, can then be forwarded to a respective BBU or CEM to which an associated processing task has been assigned. A processing task may refer to a user, a service of a user, a radio bearer of a user, a thread of a service of a user etc. Hence, in embodiments the plurality of baseband processing units can comprise control data processing units or CCEMs and payload data processing units or SCEMs. The means for inspecting can be operative to determine, whether the data packet is a control data packet or a payload data packet based on the information on the source or the destination of the data packet.

In embodiments the data packet can refer to a radio bearer. A radio bearer is a protocol context for a data service of a user. In other words, a user may utilize multiple services, which are provided using different radio bearers. A radio bearer can be established utilizing protocols of multiple layers. A prominent example is the Signaling Radio Bearer (SRB) for exchanging signaling or control information of layer 3, as part of the Radio Resource Control (RRC) protocols in UMTS or LTE. Such an SRB involves a protocol context, i.e. it uses the service provided by layer 2 to exchange layer 3 control information or signaling. The service provided by layer 2 is referred to as the radio bearer. The control plane (c-plane) radio bearers, which are provided by the Radio Link Control (RLC) protocol to RRC, are denoted as signaling radio bearers; cf. e.g. 3GPP Specification, Radio Interface Protocol Architecture 3GPP TS 25.301 V10.0.0. In UMTS or LTE the PHYsical layer (layer 1 or PHY), the Medium Access Control layer (layer 2 or MAC), RLC-layer and RRC can be involved. All of these protocols have been standardized by the 3GPP and their respective specifications are published and are considered as known in the following.

In embodiments the source network node, from which the data packet is received by the means for receiving, can correspond to an edge-node of the RAN. For example, the source node can correspond to one or more elements of the group of a network edge node, a network gateway, a mobility management entity, a radio network controller, a serving gateway, a control plane data packet processing entity, or a user plane data packet processing entity. In other words, the source network node may correspond to one of the network nodes which terminate the RAN, i.e. which are the interfaces to the RAN in terms of interfacing nodes to the outside of the RAN (e.g S-GW, RNC) or in terms of RAN-internal nodes, which, however, terminate RAN-internal protocol as e.g. certain c-plane signaling (MME, RNC).

Embodiments may terminate the protocol interfaces and perform an n-tuple, m-step routing process, which can be realized by nested table lookup, to find the virtual entity for the execution. Once found, the protocol headers can be adjusted, for example, to allow an IP protocol based transport within the cloud. From a birds-eye view the routing process can resemble the function of a Network Address Translation (NAT)—or a Network Address Port Translation (NAPT) Gateway differing in that the mapping from inner to outer addressing is not chosen arbitrarily as in case of NA(P)T, but on the knowledge gained by deep packet inspections.

In embodiments the means for inspecting can be operative to perform one or more operations on the data packet as the second packet inspection based on the information on the source or destination of the data packet. The one or more operations can be in sequence and a subsequent operation can be based on the result of a prior operation. Thus, as opposed to traditional routers, which use a key-value pair to perform their work, embodiments may use a more complex routing engine. For a conventional concept a key typically corresponds to the IP destination address of the packets to be routed and the value corresponds to the local port of the router the packet shall be sent out. The key is masked and extracted from the packet and is looked up in the routing table as 'search' or 'entry' key. In embodiments there can be multiple sequential operations. The one or more operations can, for example, correspond to one or more elements of the group of a masking operation, a look-up operation in a look-up table, a replacement operation on address information, or a replacement of routing information.

Furthermore, the means for inspecting can be operative to select one of one or more look-up tables, wherein the one or more look-up tables are selected based on the information on the source or the destination. The means for inspecting can be further operative to perform the second packet inspection based on the one look-up table. In other words, as part of the first packet inspection a source or destination address may be masked from the data packet header. The address may then be used as entry key or input value for a look-up table. The look-up table may then provide as an output information further details on the second packet inspection, as e.g. where to look in the data packet payload, what to look for (data format), any further look-up table to be used subsequently for the second packet inspection, etc. Thus the one or more look-up tables can comprise information on a subsequent operation on the data packet and the second packet inspection can comprise the subsequent operation. That is to say, the subsequent operation can be carried out with the second packet inspection.

A look-up table may comprise multiple rows and each row may comprise a key-value as an input value, an action or operation to be performed as second packet inspection as a first output value, and a second output value as input value for the second packet inspection for the action or operation to be performed with, e.g. a position in the data packet payload to look for the identification of the data packet destination. The look-up table may comprise at least two rows with differing entry sizes. In other words, the sizes of the rows in the look-up table may differ, as their entries or their number of entries may differ, e.g. by multiple output values as multiple input values for the second packet inspection.

The means for inspecting can comprise a look-up core unit, which is operative to look-up a subsequent operation and an input value for the subsequent operation from a look-up table based on a key-value. The means for inspecting can be operative to iteratively run the look-up core, starting with the information on the source or destination as a first key value, to determine the information on the identification of the destination. In other words the means for inspecting may carry out iterations. One step of the iteration can use the look-up core unit to perform a table look-up based on a key value, which can be a source or destination address from the data packet header for the first iteration. The iteration may then output what to do in a subsequent iteration and input values for the subsequent iteration. For example, the subsequent iteration can correspond to another look-up using the look-up core, now using the output of the first iteration as input into a look-up table, which is selected based on the output of the first iteration, and so on. In some embodiments a recursive search for the information on the identification on the destination of the data packet can be implemented using subsequent look-up actions or operations based on the look-up core.

In further embodiments the means for determining can be operative to determine the subsequent network node using one of a plurality of look-up tables. The one look-up table can be selected from the plurality of look-up tables based on the information on the identification of the destination of the data packet. In other words, the means for inspecting may carry out interim decisions to find the information on the destination and the final decision can be made by the means for determining, which may use the information on the destination as key or entry value to a look-up table, which comprises a mapping of the identification and the network node, which carries out the processing task related or associated to the identification.

Embodiments also provide a method for routing data packets in a radio access network. The method comprises a step of receiving a data packet from a source network node. The data packet comprises a data packet header and a data packet payload. The method further comprises a step of inspecting the data packet by performing a first packet inspection on the data packet header to determine information on a source or a destination of the data packet from the data packet header, and by performing a second packet inspection on the data packet payload based on the information on the source or the destination of the data packet to determine information on an identification of the destination of the data packet. Moreover, the method comprises a step of determining information on a subsequent network node based on the information on the identification of the destination of the data packet.

Embodiments can further comprise a computer program having a program code for performing one of the above described methods when the computer program is executed on a computer or processor.

Embodiments may provide the advantage that resource sharing, resource pooling and load balancing can be enabled in an efficient manner. Moreover, an energy consumption of a RAN may be reduced due to the enabled power down of space capacity, i.e. capacity that can be freed after corresponding load distribution. Moreover, embodiments may enable seamless operation towards the peering standardized components and interoperation with installed base station transceivers. Embodiments may also increase the stability on a RAN as automated redundancy is made available through the flexible load distribution. Moreover, mixed operation with virtualized and non-virtualized network components can be established. A RAN-cloud may be managed and operated independently from the network management and operation. Embodiments may provide the advantage that radio technologies can be mixed flexibly and that hardware can be reused for the SCEM and CCEM, BBUs, respectively. Another advantage is that software updates can be carried out on unused or load-free BBUs such that no downtimes occur due to software updates.

With respect to a reference scenario of a traditional RAN fully equipped and laid out for peak load at each base station, early studies on the cloud based RAN indicate a gain between 40% and 80% of CAPEX and OPEX. Summarizing, embodiments may improve benefits of resource sharing, load balancing, redundancy, and/or power-down.

BRIEF DESCRIPTION OF THE FIGURES

Some other features or aspects will be described using the following non-limiting embodiments of apparatuses and/or methods and/or computer programs by way of example only, and with reference to the accompanying figures, in which.

DESCRIPTION OF SOME EMBODIMENTS

In the following some components will be shown in multiple figures, where similar reference signs refer to similar components. Repetitive descriptions may be avoided for simplicity purposes. Features or components depicted in dotted lines are optional.

Figure 1:
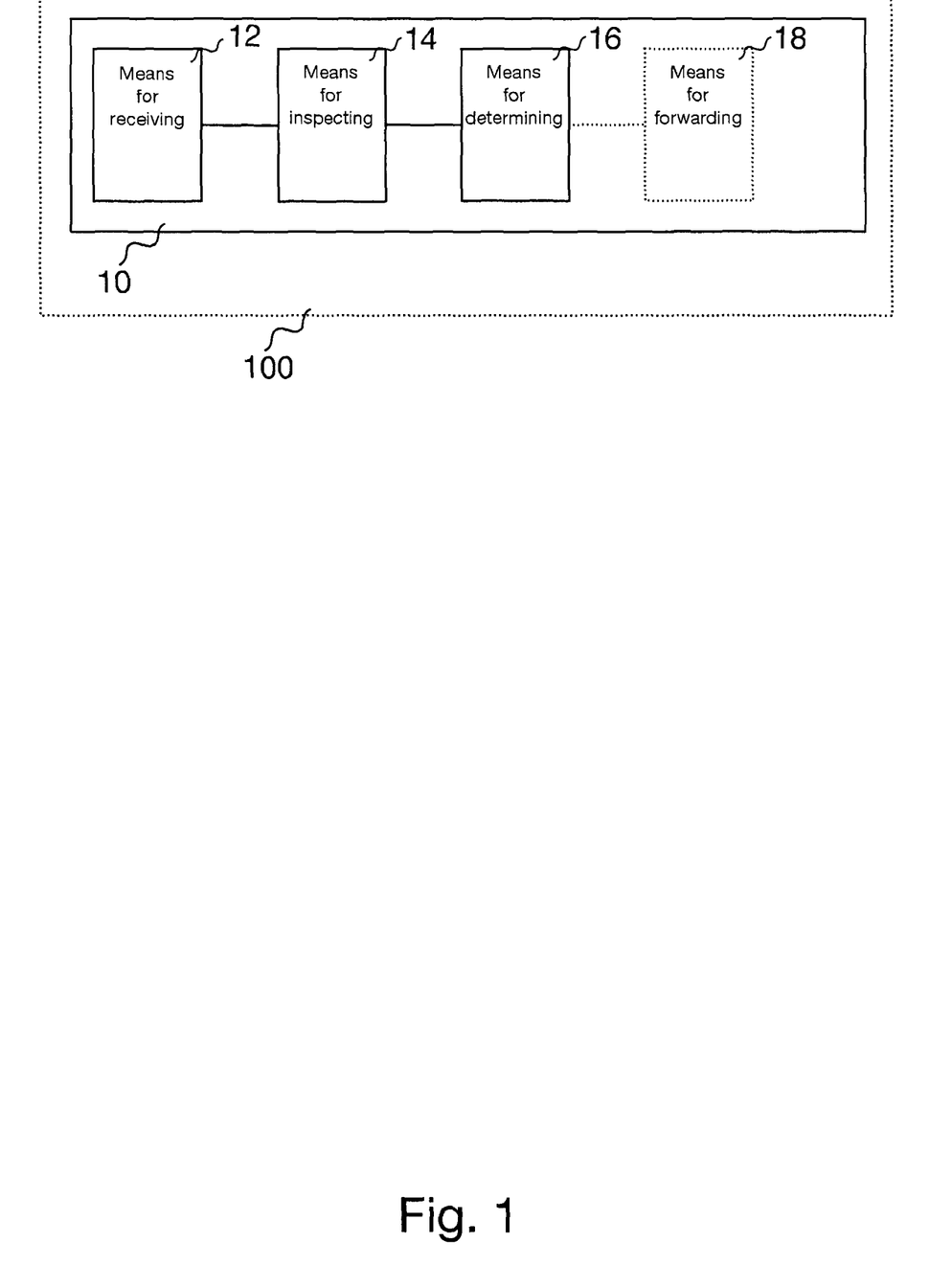
FIG. 1 shows an embodiment of an apparatus for routing.

FIG. 1 depicts an embodiment of an apparatus 10 for routing data packets in a radio access network. FIG. 1 further shows an optional router 100, which comprises the router apparatus 10. The apparatus 10 comprises means for receiving 12 a data packet from a source network node, the data packet comprises a data packet header and a data packet payload. The means for receiving 12 is coupled to means for inspecting 14 the data packet. The means for inspecting 14 is operative to perform a first packet inspection on the data packet header to determine information on a source or a destination of the data packet from the data packet header. The means for inspecting 14 is also operative to perform a second packet inspection on the data packet payload based on the information on the source or the destination of the data packet to determine information on an identification of the destination of the data packet. The means for inspecting is coupled to means for determining 16 information on a subsequent network node based on the information on the identification of the destination of the data packet. In embodiments the router apparatus 10 can further comprise means for forwarding 18 the data packet to the subsequent network node, which is shown optionally in FIG. 1 indicated by the dotted line.

Figure 2:
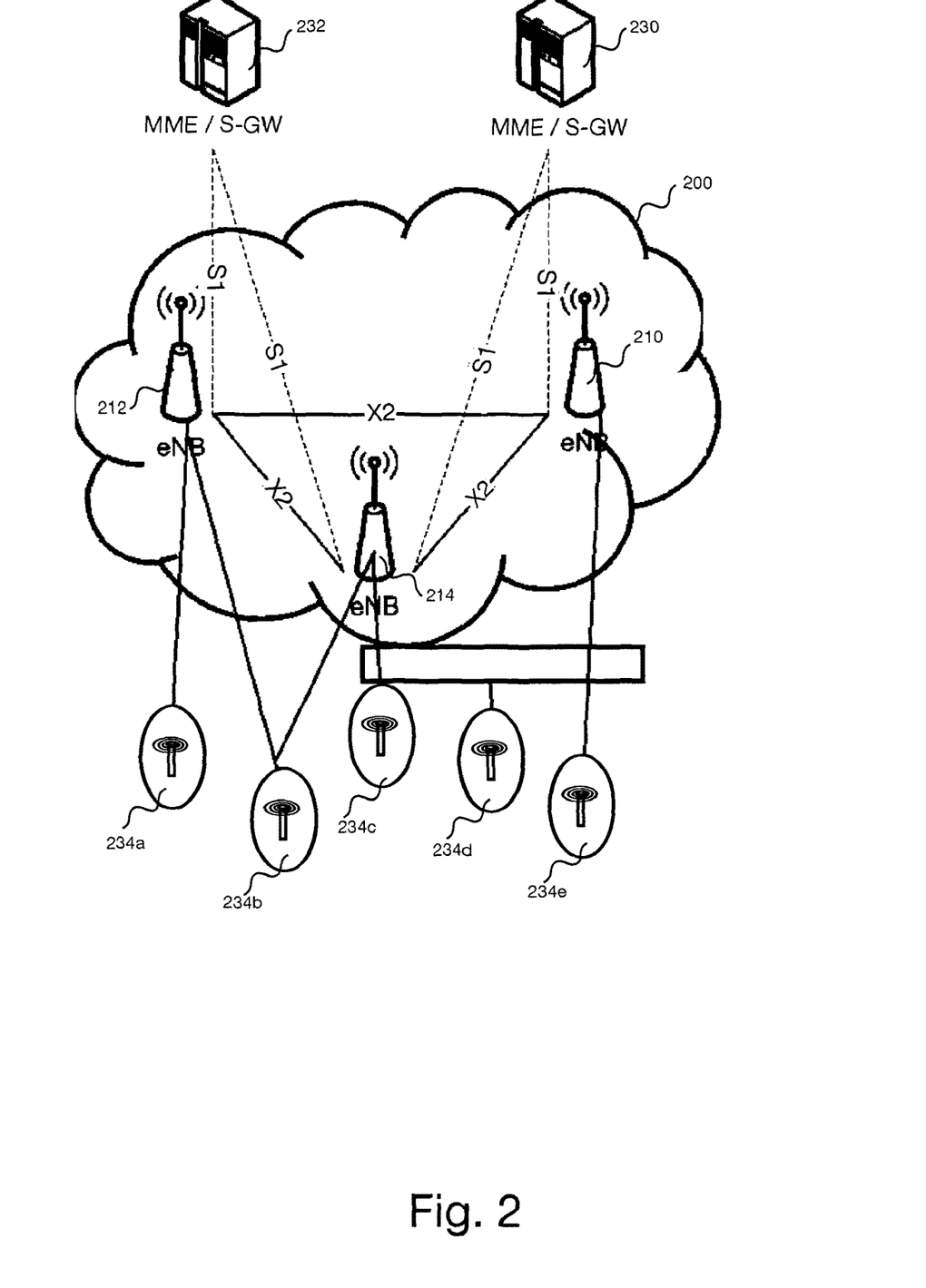
FIG. 2 shows a network scenario.

FIG. 2 illustrates a network scenario, which is exemplified as an E-UTRAN 200. FIG. 2 shows three eNodeBs (eNB) 210, 212, and 214 as base station transceivers, which are interconnected by the X2 interface. Moreover, the three eNBs 210, 212, and 214 are connected to two edge nodes 230 and 232, corresponding to MMEs and/or S-GWs, using the S1 interface, which are the interfaces towards the core network. Furthermore, FIG. 2 depicts multiple separated antennas 234a-e, which are coupled to the respective eNBs 210, 212, 214. The additionally separated antennas 234a-e depicted at the bottom of FIG. 2 indicate the split of an eNodeB into BBU and RRH.

Figure 3:
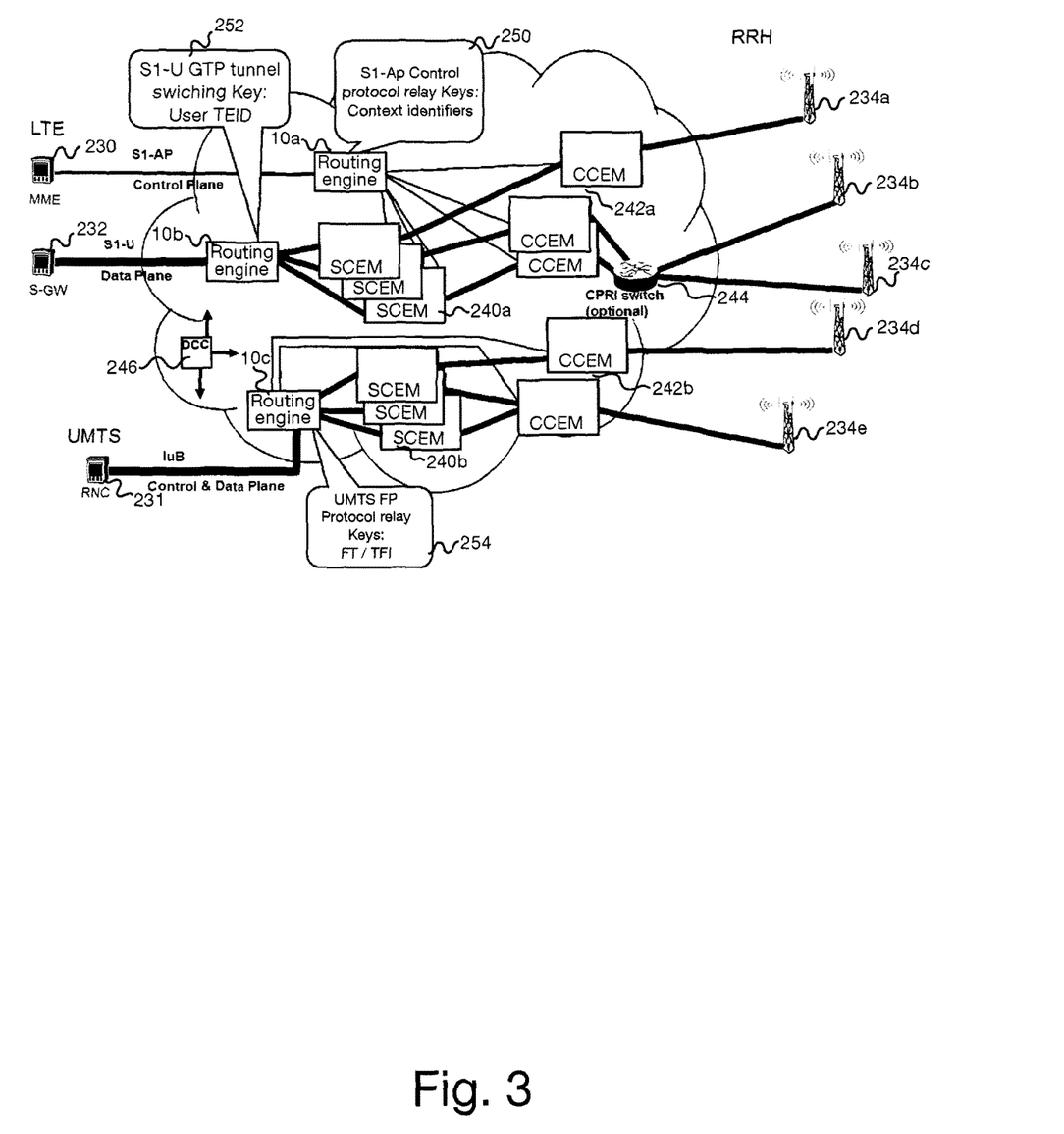
FIG. 3 shows a network scenario with split BBUs and a router with an embodiment.

Another network scenario is illustrated in FIG. 3. On the very left hand side FIG. 3 shows three potential source network nodes 230, 231, and 232, namely an LTE MME 230, an LTE S-GW 232, and a UMTS RNC 231. The MME 230 provides control plane data packets over the S1-AP interface, while the S-GW 232 provides data packets for the data (user)-plane over the S1-U interface. The RNC 231 provides data packets for both, the control and the data (user)-plane, over the IuB interface. Moreover, FIG. 3 shows three embodiments of routing engines 10a, 10b, and 10c, which all comprise an apparatus 10. As indicated in the Figure there is one routing engine in each path of the S1-AP, S1-U, and IuB. Moreover it can be seen from FIG. 3 that the respective BBUs are separated or split in multiple SCEM 240a and multiple CCEM 242a for the E-UTRAN, and multiple SCEM 240b and multiple CCEM 242b for the UTRAN. The multiple CEM 240ab, 242ab are then followed by multiple RRHs 234a-e, with an optional CPRI switch 244 in between.

FIG. 3 shows the overall architecture of a cloud based RAN with the BBU components SCEM and CCEM and routing engines 10abc as embodiments. Additionally and independently from the radio technology used, a (distributed) cloud controller 246 can be introduced to administer the cloud RAN, i.e. in this example offering LTE and UMTS at the same time.

The radio access network of FIG. 3 comprises a plurality of baseband processing units (SCEM 240ab plus CCEM 242ab) for processing baseband data for subsequent radio transmission through the RRHs 234a-e. The plurality of baseband processing units comprises control data processing units (CCEM 242ab) and payload data processing units (SCEM 240ab). The means for inspecting 14, cf. FIG. 1, is operative to determine whether the data packet is a control data packet or a payload data packet based on the information on the source or the destination of the data packet. In case of a control data packet a further step of determination can be carried out to figure out if the control packet relates to cell functionality and therefore to the CCEM or to user data related bearers and therefore to a SCEM processing that payload. That is to say, CCEN and SCEN may both process control traffic, e.g. via S1-AP, the means for inspecting 14 can be operable to determine the subsequent network node using deeper or subsequent further packet inspection. A baseband processing unit is assigned to process data of a service of the destination of the data packet, and the subsequent network node corresponds to the baseband processing unit (SCEM 240ab or CCEM 242ab), which is assigned to a service the data packet payload relates to.

FIG. 3 further depicts three examples for key values or identifications, which are obtained by the three routing engines 10abc and which are given in the three bubbles 250, 252, 254. Routing engine 10a, which is located in the path of the S1-AP, may determine a context identifier as key or identification as indicated by bubble 250. Routing engine 10b, which is located in the S1-U path, may determine a user Tunnel Endpoint IDentifier (TEID) from the data packets received on the S1-U as switching key or identifier from the General Packet Radio Service (GPRS) Tunneling Protocol (GTP). All user IDs in GTP-U can be inspected. Routing engine 10c, which is located in the IuB path, may determine a Frame Type (FT) or a Transport Format Indicator (TFI) from the UMTS Framing Protocol (FP) as identification.

The means for inspecting 14, cf. FIG. 1, is operative to perform operations on the data packet as the second packet inspection based on the information on the source or destination of the data packet. The one or more operations are in sequence and a subsequent operation is based on the result of a prior operation. The operations can correspond to one or more elements of the group of a masking operation, a look-up operation in a look-up table, a replacement operation on address information, or a replacement of routing information, which will be detailed subsequently.

In the following the two embodiments of routing engines 10a and 10b will be described in more detail. It is further assumed that IP is used as network layer protocol in the cloud, i.e. between the MME 230 and the routing engine 10a, and between S-GW 232 and the routing engine 10b. To fan out the traffic of control and data plane to the cloud instances, more information than the IP addresses is needed. This information is spread over various headers deeper in the data packet and the position of the information is not at fixed locations. So the routing engine 10 has to follow a sequence of decisions to find the destination to route to.

Figure 4:
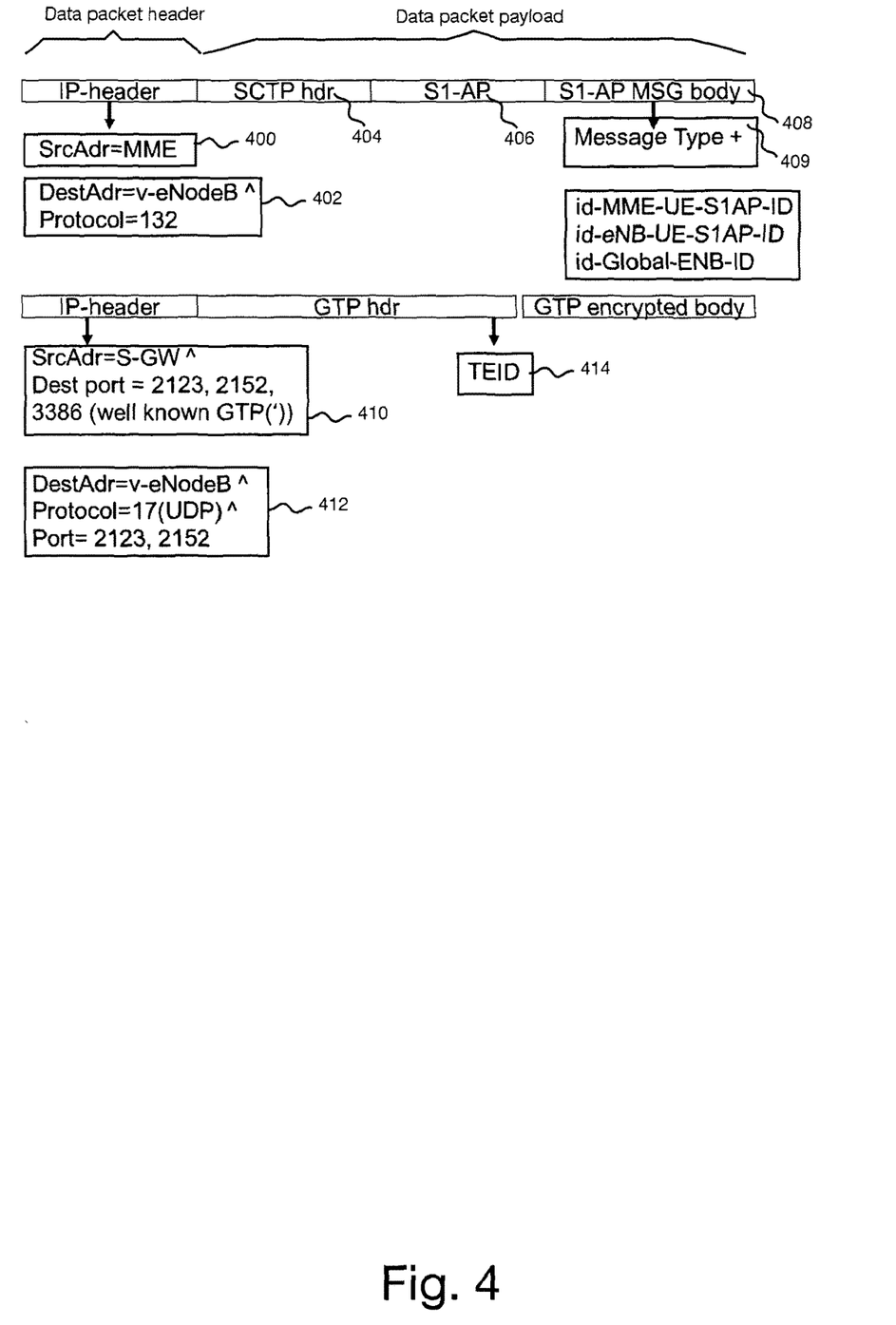
FIG. 4 illustrates an example of a data packet in an E-UTRAN in an embodiment.

FIG. 4 illustrates the distribution of routing information and packet inspection in embodiments using the packet structure of an LTE RAN. At the top of FIG. 4 an example of a data packet as an IP-packet is shown, where it can be seen that the data packet header corresponds to the IP-header and that the data packet payload comprises multiple other protocols. The data packet exemplified at the top of FIG. 4 is assumed to be an S1-AP data packet received at the routing engine 10a from the MME 230, i.e. it shows the packet header information of the control plane. The IP-header comprises a source address 400 (MME 230) and a destination address 402, here a virtual eNB. In this case the routing engine 10a, i.e. the means for inspecting 14 therein, may check the IP source address 400 against a list of allowed MMEs, alternatively it could check the destination address 402, and the IP protocol field for the Streaming Control Transport Protocol (SCTP) header 404. For simplicity reasons encryption and ciphering is not considered for the subsequent steps. As shown in FIG. 4 the data packet payload further comprises an S1-AP header 406 and an S1-AP message body 408. The next relevant field at a fixed location is the 'message type' 409 in the S1-AP message body 408. Depending on the message-type 409 the routing engine can be selected, i.e. a subsequent operation or action is based on the content of the 'message-type'-field 409, an appropriate table for the next step and its related bit-mask for the header can be selected.

The key information found, i.e. the identification of the destination, e.g. id-MME-UE-S1AP-ID, id-eNB-UE-S1AP-ID, id-Global-eNB-ID, provides enough information for the final routing decision, which is carried out by the means for determining 16, and which constitutes the final information for the routing decision in this embodiment.

At the bottom of FIG. 4 an example of a data packet as an IP-packet is shown, where it can be seen that the data packet header corresponds to the IP-header and that the data packet payload comprises multiple other protocols. The data packet exemplified at the bottom of FIG. 4 is assumed to be an S1-U data packet received at the routing engine 10b from the S-GW 232, i.e. it shows the packet header information of the user plane. The IP-header comprises a source address 410 (S-GW 232) with a port address, which can be an endpoint of a GTP tunnel, and a destination address 412, again a virtual eNB. The process for the routing engine of the data plane is slightly simpler because all information is located at fixed positions, so after verification of a valid source and protocol (above IP) the key TEID 414 is sufficient for a final routing decision. In this case the routing engine 10b, i.e. the means for inspecting 14 therein, may check the IP source address against a list of allowed S-GWs, alternatively it could verify the destination address 412, and then determine the TEID 414, which constitutes the final information for the routing decision in this embodiment.

Figure 5:
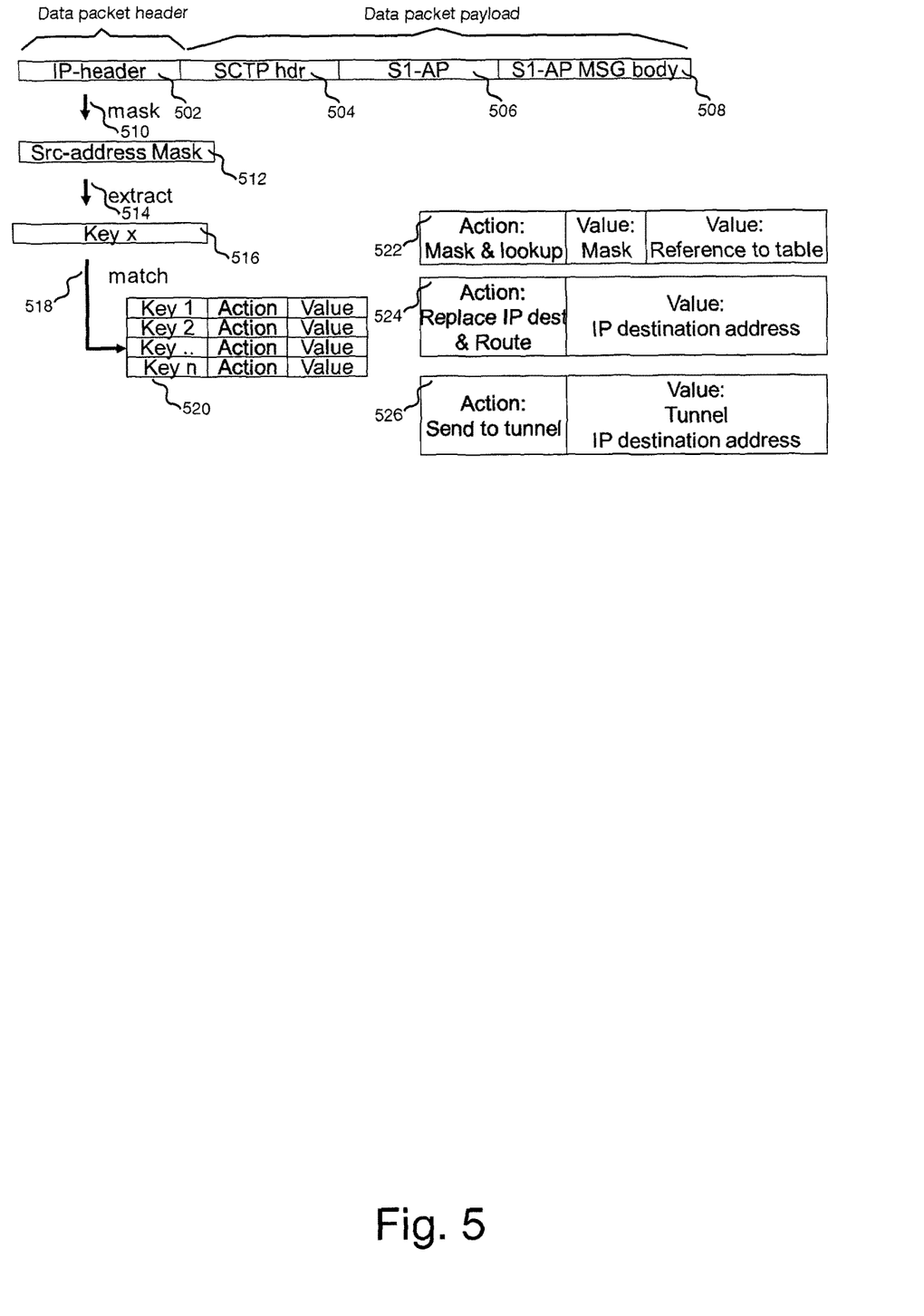
FIG. 5 illustrates the usage of look-up tables in an embodiment.

FIG. 5 illustrates the usage of look-up tables in an embodiment. FIG. 5 shows the table structure the cloud ran routing engine is based on. In the routing apparatus 10 the means for inspecting 14 is operative to select one of one or more look-up tables and the look-up tables are selected based on the information on the source or the destination. FIG. 5 illustrates another IP-packet at the top, which comprises the data packet header and the data packet payload sections. The data packet header comprises an IP-header 502 and the data packet payload comprises an SCTP header 504, an S1-AP information 506, and an S1-AP message body part 508. As part of the first packet inspection the source address is masked from the IP-header 502 in step 510. From the source address 512 a key value 516 can be extracted in step 514. The key value can then be used as an input value into a look-up table 520. For example, the key value 516 is matched in step 518 to an entry in the first column of the look-up table 520.

Aside from the key entry the look-up table 520 comprises information on a subsequent operation or action on the data packet and another value for the subsequent operation or action to be based on. In other words, the look-up table comprises multiple rows and each row comprises a key-value as an input value, an action or operation to be performed as second packet inspection as a first output value, and a second output value as input value for the second packet inspection for the action or operation to be performed with. The second packet inspection then comprises the subsequent operation based on the value. That is to say, the means for inspecting 14 is further operative to perform the second packet inspection based on an action or operation determined by the one look-up table 520. An operation or action to be carried out in the second packet inspection can be determined in the first packet inspection by means of the look-up table 520. The second packet inspection itself may carry out another look-up operation based on another look-up-table.

In other words, the key 516 allows finding a decision, i.e. a further action or operation to perform, in the look-up table 520. The mask for masking source address 512 can have a variable size. An action to be executed when the match is found and the value that is used to perform the next step action can have a variable size, too. Hence, the look-up table 520 comprises at least two rows with differing entry sizes. The table 520 shown in FIG. 5 consists of triples with variable size. An action or operation can be any further step using deeper packet inspection. FIG. 5 illustrates a "Mask & lookup" action 522, which can be carried out in the next loop in the routing process, e.g. as the second packet inspection. This operation is exemplified as having two values, one for a mask used for the next packet inspection and a reference on a next look-up table to be used for the next packet inspection. FIG. 5 further exemplifies a "Replace IP destination address & route" action 524, which may correspond to a Network Address Translation (NAT) action, where the value would then correspond to an IP destination address. Moreover, FIG. 5 illustrates a "Send to tunnel" action 526, which can be used to reach a virtualized component of the cloud RAN, and in which the value corresponds to an IP destination address of a tunnel. Other actions or operations can comprise a "Send to port" action, which could correspond to traditional routing but with an extended addressing scheme.

As the embodiment detailed with FIG. 5 shows, the routing process may have two different basic types of actions. The first one is an interim action, cf. action 522 in FIG. 5, leading closer to a decision, typically defining a mask and a table for the next look-up, which are carried out by the means for inspecting 14. The other one is a final action, cf. actions 524 and 526 in FIG. 5, defining what to do with and where to route a packet, which is carried out by the means for determining 16. The means for determining 16 can then also be operative to determine the subsequent network node using one of a plurality of look-up tables. The one look-up table is then selected from the plurality of look-up tables based on the information on the identification of the destination of the data packet.

In the embodiment, the means for inspecting 14 comprises a look-up core unit, which will be detailed subsequently using FIG. 8. The look-up core is operative to look-up a subsequent operation and an input value for the subsequent operation from the look-up table 520 based on the key-value 516. The means for inspecting 14 is then operative to iteratively run the look-up core, starting with the information on the source or destination as a first key value, to determine the information on the identification of the destination. This iteration, which can also be implemented as a recursion, will be detailed in the following.

Figure 6:
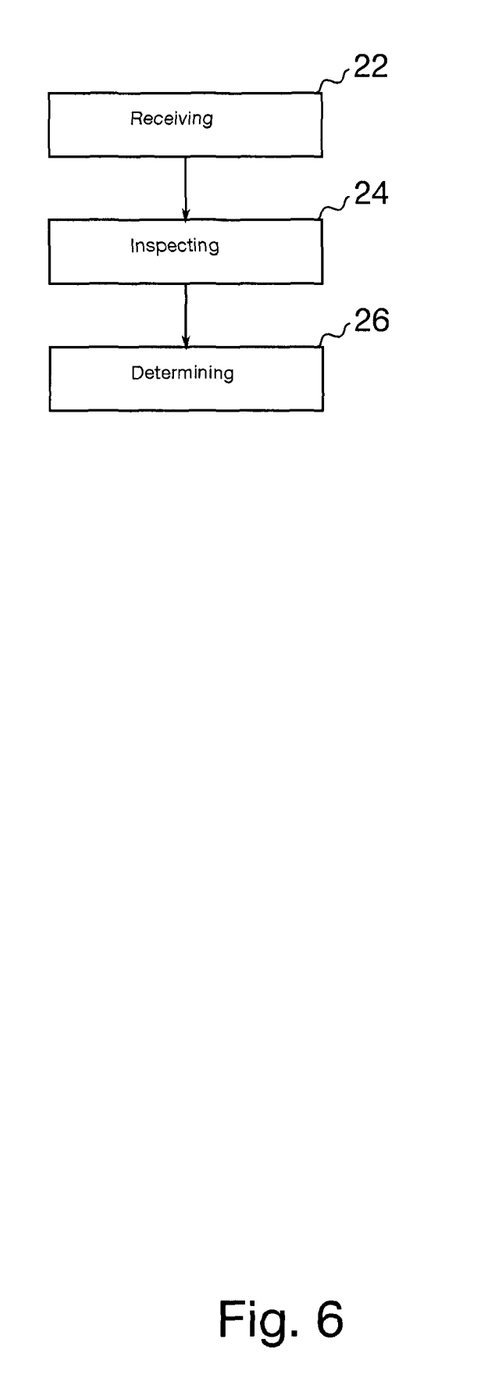
FIG. 6 shows a flow chart of an embodiment of a method for routing.

FIG. 6 shows a flow chart of an embodiment of a method for routing data packets in a radio access network. The method comprises a step of receiving 22 the data packet from a source network node. The data packet comprises a data packet header and a data packet payload. The method further comprises a step of inspecting 24 the data packet by performing a first packet inspection on the data packet header to determine information on a source or a destination of the data packet from the data packet header, and by performing a second packet inspection on the data packet payload based on the information on the source or the destination of the data packet to determine information on an identification of the destination of the data packet. The method comprises a further step of determining 26 information on a subsequent network node based on the information on the identification of the destination of the data packet.

Figure 7:
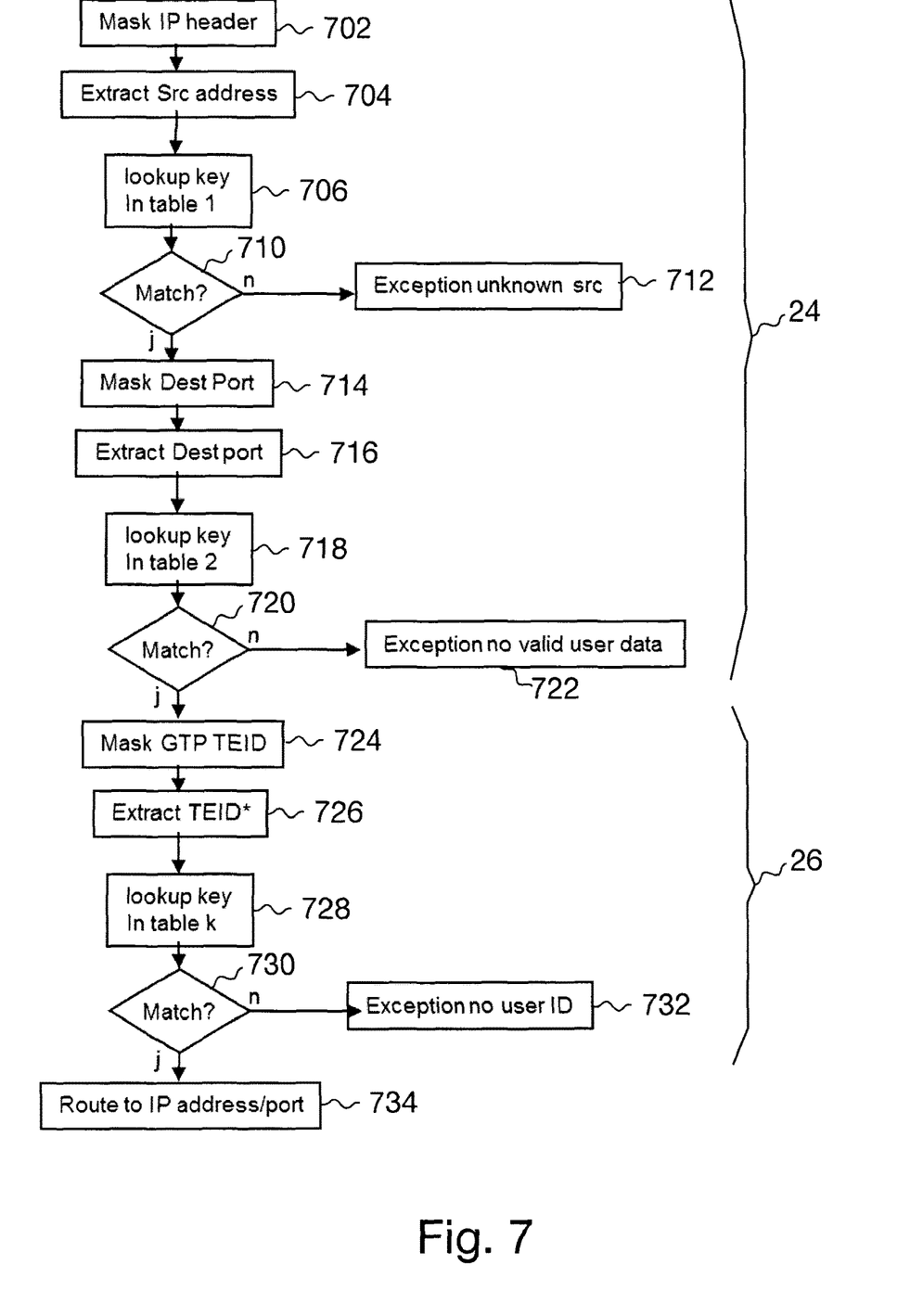
FIG. 7 shows a flow chart of a routing process in an embodiment.

The routing process in an embodiment will be further detailed using the flow chart in FIG. 7. FIG. 7 shows the steps of inspecting 24 and determining 26 of FIG. 6 in more detail for the embodiment in the LTE data path, cf. also FIG. 4 at the bottom. In a first packet inspection the IP-header is masked 702 and the source address is extracted 704. In a first look-up operation 706 the source address is verified using a first look-up table. If the source address cannot be verified in step 710 an exception handling is carried out in step 712. If the source address is verified in step 710, the destination port can be masked an extracted in steps 714 and 716 as the second packet inspection. Moreover, a second look-up operation 718 using a second look-up table is used to validate the destination port. If the destination port is not valid, exception handling is performed in step 722 for invalid user data. If the destination port is valid, the determining step 16 starts with masking and extracting the GTP TEID in sub-steps 724 and 726. Yet another look-up table can be used in step 728 to find an IP address and port based on the TEID. If the table contains no entry for the TEID, exception handling is carried out in step 732. Otherwise routing to the IP address and port can be performed in step 734, e.g. through the means for forwarding 18.

Figure 8:
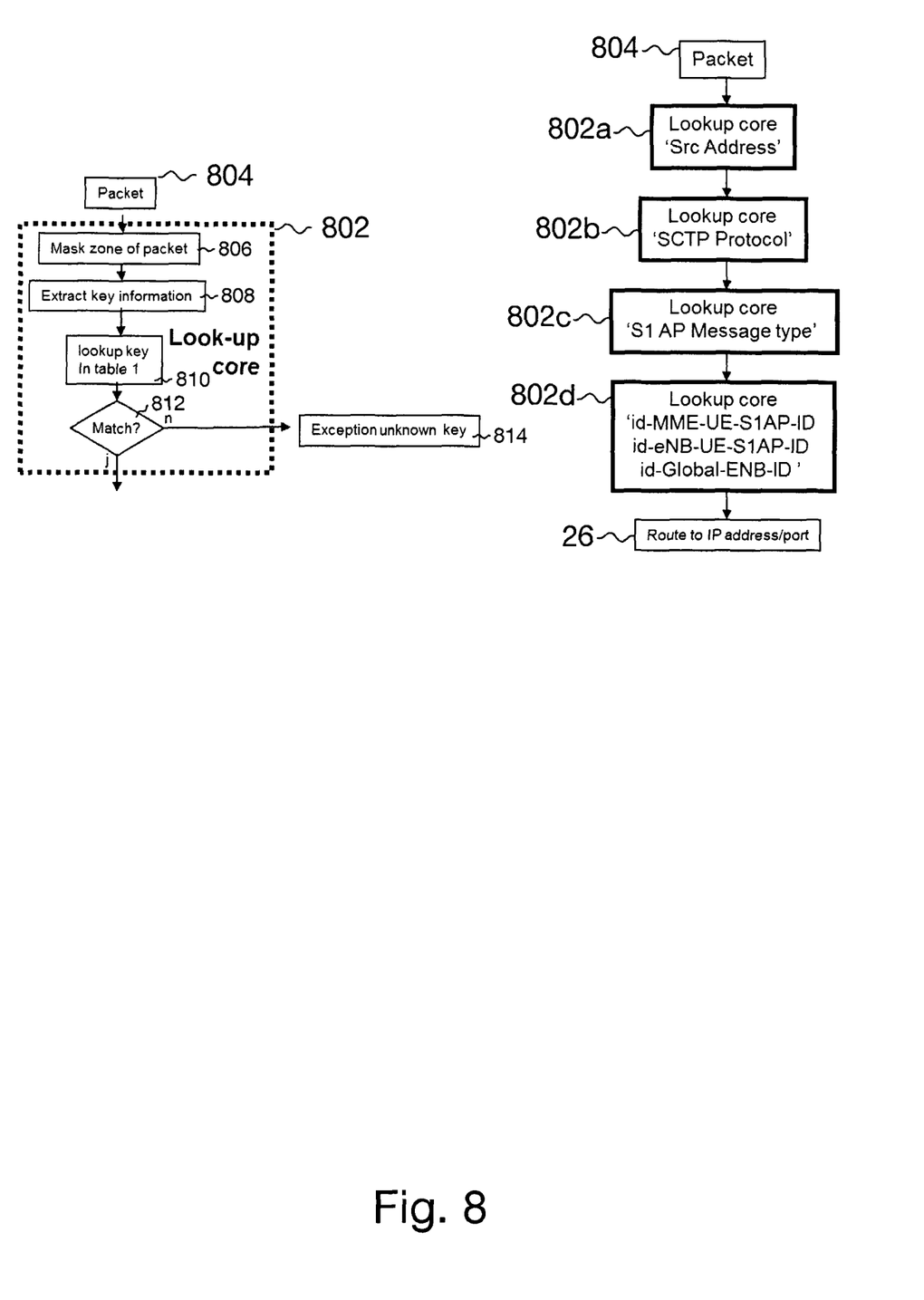
FIG. 8 shows a flow chart of a routing process in an embodiment.

FIG. 8 shows a flow chart of a routing process in an embodiment in the LTE control path. FIG. 8 illustrates a look-up core unit 802 on the left hand side. A received data packet 804 is provided to the look-up core 802. The look up core 802 comprises the steps of masking a respective zone of the packet 806, extracting key information from the data packet 808 and a look-up operation 810 in a look-up table based on the key. Moreover, a key verification is carried out in step 812, if no key match is found in the look-up table, external exception handling can be carried out in external step 814. As it has already been mentioned above the look-up core unit 802 can be run iteratively, where in each iteration different look-up tables and/or actions or operations can be carried out. In FIG. 8 on the right hand side a sequence of iterations in an embodiment is displayed, where the look-up core unit is iterated through the iterations 802a, 802b, 802c and 802d. The embodiment follows the routing as it has been explained with the help of FIG. 4 at the top.

The packet 804 is input into the first look-up core unit 802a, which is performed based on the source address. The second look-up core unit 802b is based on the SCTP protocol, the third look-up core unit 802c is based on the S1-AP message type, and the fourth look-up core unit 802d delivers the identification, i.e. one of id-MME-UE-S1AP-ID, id-eNB-UE-S1AP-ID, or id-Global-ENB-ID. The identification can then be used for determining the IP address/port of the subsequent network node in step 26, in line with what was described above with respect to FIG. 4.

From the perspective of information flow, the core 802 of the cloud RAN routing engine can be seen as a set of compact instructions named 'look-up core', that can be used recursively, as shown in FIG. 8. On the left side this core 802 is shown, which typically acts on a packet but may be used for any structured data. It consists of mask 806, information extraction 808, look-up 810 and decision 812. On the right side the execution for the LTE control plane is shown, where each block in the sequence is composed of one look-up core 802.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as magnetic disks and magnetic tapes, hard drives, or optically readable digital data storage media. The embodiments are also intended to cover computers programmed to perform said steps of the above-described methods.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

Functional blocks denoted as "means for . . . " (performing a certain function) shall be understood as functional blocks comprising circuitry that is adapted for performing or to perform a certain function, respectively. Hence, a "means for s.th." may as well be understood as a "means being adapted or suited for s.th.". A means being adapted for performing a certain function does, hence, not imply that such means necessarily is performing said function (at a given time instant).

The functions of the various elements shown in the Figures, including any functional blocks labeled as "means", "means for receiving", "means for inspecting", "means for determining", "means for forwarding", etc., may be provided through the use of dedicated hardware, such as "a receiver", "an inspector", "a determiner", "a forwarder", "a processor", "a controller", "a DSP", etc. as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the Figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

The invention claimed is:

1. An apparatus for routing data packets in a radio access network, the apparatus comprising:
   at least one processor; and
   at least one memory including computer program code;
   the at least one memory and the computer program code configured to, with the at least one processor, cause the apparatus at least to perform:
   receiving a data packet from a source network node, the data packet comprising a data packet header and a data packet payload;
   inspecting the data packet by performing a first packet inspection on the data packet header to determine information on a source or a destination of the data packet from the data packet header, and by performing a second packet inspection on the data packet payload based on the information on the source or the destination of the data packet to determine information on an identification of the destination of the data packet;
   determining information on a subsequent network node based on the information on the identification of the destination of the data packet; and
   forwarding the data packet to the subsequent network node as an interim action or as a final action, wherein an interim action defines a mask and a table for a next look-up and a final action defines what to do with and where to forward a packet,
   wherein the at least one memory and the computer program code are configured to, with the at least one processor, cause the apparatus at least to perform determining the subsequent network node using one of a plurality of look-up tables, the one look-up table being selected from the plurality of look-up tables based the information on the identification of the destination of the data packet.

2. The apparatus of claim 1, wherein the source network node corresponds to one or more elements of the group of a network edge node, a network gateway, a mobility management entity, a radio network controller, a serving gateway, a control plane data packet processing entity, or a user plane data packet processing entity.

3. The apparatus of claim 1, wherein the radio access network comprises a plurality of baseband processing units for processing baseband data for subsequent radio transmission, wherein a baseband processing unit is assigned to process data of a service of the destination of the data packet, and wherein the subsequent network node corresponds to the baseband processing unit which is assigned to a service the data packet payload relates to.

4. The apparatus of claim 3, wherein the plurality of baseband processing units comprises control data processing units and payload data processing units, and wherein the at least one memory and the computer program code are configured to, with the at least one processor, cause the apparatus at least to perform determining whether the data packet is a control data packet or a payload data packet based on the information on the source or the destination of the data packet.

5. The apparatus of claim 1, wherein the at least one memory and the computer program code are configured to, with the at least one processor, cause the apparatus at least to perform one or more operations on the data packet as the second packet inspection based on the information on the source or destination of the data packet, wherein the one or more operations are in sequence, and wherein a subsequent operation is based on the result of a prior operation, wherein the one or more operations correspond to one or more elements of the group of a masking operation, a look-up operation in a look-up table, a replacement operation on address information, or a replacement of routing information.

6. The apparatus of claim 1, wherein the at least one memory and the computer program code are configured to, with the at least one processor, cause the apparatus at least to perform selecting one of one or more look-up tables, wherein the one or more look-up tables are selected based on the information on the source or the destination determined with the first packet inspection, wherein the at least one memory and the computer program code are configured to, with the at least one processor, cause the apparatus at least to perform the second packet inspection based on the one look-up table.

7. The apparatus of claim 6, wherein the one or more look-up tables comprise information on a subsequent operation on the data packet and wherein the second packet inspection comprises the subsequent operation, wherein the operation corresponds to one or more elements of the group of a masking operation, a look-up operation in a look-up table, a replacement operation on address information, or a replacement of routing information.

8. The apparatus of claim 6, wherein a look-up table comprises multiple rows and wherein each row comprises a key-value as an input value, an action or operation to be performed as second packet inspection as a first output value, and a second output value as input value for the second packet inspection for the action or operation to be performed with.

9. The apparatus of claim 8, wherein the look-up table comprises at least two rows with differing entry sizes.

10. The apparatus of claim 1, wherein the at least one memory and the computer program code are configured to, with the at least one processor, cause the apparatus at least to perform looking up a subsequent operation and an input value for the subsequent operation from a look-up table based on a key-value, wherein the one or more processors are configured to iteratively run the look-up core, starting with the information on the source or destination as a first key value determined with the first packet inspection, to determine the information on the identification of the destination.

11. A method for routing data packets in a radio access network, the method comprising
- receiving a data packet from a source network node, the data packet comprising a data packet header and a data packet payload;
- inspecting the data packet by,
  - performing a first packet inspection on the data packet header to determine information on a source or a destination of the data packet from the data packet header, and
  - performing a second packet inspection on the data packet payload based on the information on the source or the destination of the data packet to determine information on an identification of the destination of the data packet;
- determining information on a subsequent network node based on the information on the identification of the destination of the data packet; and
- forwarding the data packet to the subsequent network node as an interim action or as a final action, wherein an interim action defines a mask and a table for a next look-up and a final action defines what to do with and where to forward a packet,
- wherein the method further comprises determining the subsequent network node using one of a plurality of look-up tables, the one look-up table being selected from the plurality of look-up tables based the information on the identification of the destination of the data packet.

12. A non-transitory computer-readable medium comprising program instructions for causing an apparatus to perform at least the following:
- receiving a data packet from a source network node, the data packet comprising a data packet header and a data packet payload;
- inspecting the data packet by:
  - performing a first packet inspection on the data packet header to determine information on a source or a destination of the data packet from the data packet header, and
  - performing a second packet inspection on the data packet payload based on the information on the source or the destination of the data packet to determine information on an identification of the destination of the data packet;
- determining information on a subsequent network node based on the information on the identification of the destination of the data packet; and
- forwarding the data packet to the subsequent network node as an interim action or as a final action, wherein an interim action defines a mask and a table for a next look-up and a final action defines what to do with and where to forward a packet, wherein the computer-readable medium comprises program instructions for causing the apparatus to perform at least determining the subsequent network node using one of a plurality of look-up tables, the one look-up table being selected from the plurality of look-up tables based the information on the identification of the destination of the data packet.

* * * * *